(12) United States Patent
Wilson et al.

(10) Patent No.: US 6,308,132 B1
(45) Date of Patent: Oct. 23, 2001

(54) METHOD AND APPARATUS FOR DISPLAYING REAL TIME NAVIGATIONAL INFORMATION

(75) Inventors: Blake W. Wilson; Mark Snyder, both of Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/592,326

(22) Filed: Jun. 13, 2000

(51) Int. Cl.$^7$ ........................................................ G08G 5/04
(52) U.S. Cl. ........................ 701/200; 701/208; 701/213; 340/990
(58) Field of Search ................................. 701/200, 201, 701/206, 208, 212, 213; 340/988, 982, 990, 995, 825.15

(56) References Cited

U.S. PATENT DOCUMENTS

| | | | |
|---|---|---|---|
| 6,091,009 | * | 7/2000 | Glover .................................. 701/208 |
| 6,160,998 | * | 12/2000 | Wright et al. .................... 340/825.15 |
| 6,163,681 | * | 12/2000 | Wright et al. .................... 340/825.15 |
| 6,216,088 | * | 4/2001 | Schulz et al. ......................... 701/208 |
| 6,246,960 | * | 6/2001 | Liu ......................................... 701/213 |
| 6,247,019 | * | 6/2001 | Davies .................................. 340/990 |

* cited by examiner

Primary Examiner—Richard M. Camby

(57) ABSTRACT

A method and apparatus for displaying real time navigational information on a vehicle including an informational database which is loaded and stored on an electronic medium within the vehicle. An intermediate database is created from the informational database and stored on the electronic medium. The contents of the intermediate database are transmitted to a color display unit for continuous real time display to the vehicle's operator based upon a desired reference point. In one embodiment, the intermediate database is created by fusing preselected information from the informational database and projecting the preselected information to correspond to a common graphical coordinate axis. In another embodiment, the intermediate database is created by each intermediate database created by spatially and coordinately culling the informational database to obtain spatial data stored on the electronic medium, filtering the spatial data by the software means to obtain displayable data corresponding to a geographic vicinity of a desired reference point and projecting the displayable data to a mapping system which contains a common graphical coordinate axis based upon the desired reference point.

26 Claims, 1 Drawing Sheet

METHOD AND APPARATUS FOR DISPLAYING REAL TIME NAVIGATIONAL INFORMATION

FIELD OF THE INVENTION

The present invention relates to the field of navigational instrumentation for a vehicle.

BACKGROUND OF THE INVENTION

In the prior art, operators of various navigable vehicles (such as aircraft pilots, for example) relied heavily on printed maps and single unit instrumentation to determine a vehicle's coordinate location relative to some reference point. One problem with printed maps, however, is that printed maps do not provide an accurate representation of coordinate location on the earth due to the curvature of the earth. Thus, an airplane pilot who relied on printed maps to determine location knew or should have known that any location determined from the printed maps was only an approximation and not an accurate representation of the vehicle's coordinate location. At one time the maps in use were generally better than the available navigation accuracy, but, printed charts required a concentrated effort to use.

As technology advanced, so did the tools by which the pilots determined their location. One technology, for example, is the very high omnirange (VOR) system, which includes a collection of navigation beacons or lights positioned on the ground which would allow pilots to position themselves relative to each beacon. Other tools, such as global positioning satellite systems, became available to also assist pilots in navigation, and were integrated into the instrumentation of the vehicle's navigational system. Additional tools include enhanced ground proximity warning systems (EGPWS), which is a radar-based tool combined with a database of terrain that keeps track of the location of an airplane and the ground terrain relative to each other, and further, provides an audible warning of when the airplane is close to the ground and thus, close to impact. The EGPWS would also briefly display an obstacle threat (such as a upcoming mountain) as a threat warning, but in some cases, it did not provide sufficient time to allow the vehicle's operator to guide the vehicle in a safer direction.

Another tool which has been implemented in some airplanes is known as the flight management system (FMS), which included a textual display unit which displayed limited information corresponding to navigational parameters of concern by the vehicle's operator (such as airport location, navigation aids and navigation aids). The FMS was deficient because it was not designed to display other information which may be important to the safety of the vehicle's occupants and operation of the vehicle, such as weather data including areas of known wind shear, icing, wind speed, wind direction and like data. Further, the FMS system is manually intensive and slow, requiring the vehicle's operator to input commands into an on-board keyboard, having a processor execute the commands and then slowly refreshing the FMS display screen.

Until the present invention, the prior art was void of a method or apparatus for displaying real time navigational information on a single, display unit within a vehicle having a navigational system, the information generated from a number of information sources stored in at least one database (including information relating to environmental terrain data, obstacle data, adjacent vehicle data, special use airspace data, political boundaries, state boundary lines, geographic features, navigation aids, airport information data, airway and intersection data, weather data, cultural data, man-made object data, air traffic data, wind data and flight plan data). One reason that such a tool did not exist was because computing power was not sufficiently advanced to handle the large amount of calculations required, and further, because the cost of memory available to store and manipulate significant amounts of data was expensive. Moreover, some information (such as, for example, accurate terrain and geographic data) did not exist. The present invention solves this gap in prior art technology by providing a method and an apparatus for displaying real time information which, in one preferred embodiment, is coupled to a vehicle's navigation system.

Accordingly, it is an object of the present invention to provide a method and apparatus for integration with a vehicle's navigation system, the method and tool displaying continuous information relating to environmental terrain, potential obstacles in the path of the vehicle, nearby vehicles, special use airspace, political and state boundary lines, geographic features such as rivers and lakes, navigation aids, airports and information relating to airports, airways and intersections, weather, cultural features such as highways, cities and high-tower lines or towers, proposed flight paths, wind direction and speed, drift down area and air traffic information.

It is also an object of the present invention to provide a method for displaying continuous information relating to environmental terrain, potential obstacles in the path of the vehicle, nearby vehicles, special use airspace, political and state boundary lines, geographic features such as rivers and lakes, navigation aids, airports and information relating to airports, airways and intersections, weather, cultural features such as highways, cities and high-tower lines or towers, a proposed flight path, wind direction and speed, drift down area and air traffic information on a single navigational display unit.

It is also an object of the present invention to provide a method and apparatus which communicates with both a vehicle's onboard navigational system and external offboard information sources, integrates the information from the system and external sources, and then continuously displays selected information of concern by the vehicle's operator on a single display unit.

BRIEF SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

The present invention is a method and apparatus for real time navigational display for a vehicle including an informational database which is loaded and stored on an electronic medium (such as, for example, a personal computer) within the vehicle. An intermediate database is created from the informational database and stored on the electronic medium. The contents of the intermediate database are then transmitted to a multicolor display unit for continuous display to the vehicle's operator based upon a desired reference point. In one embodiment, the intermediate database is created by fusing preselected information from the informational database and projecting the preselected information to correspond to a common graphical coordinate axis.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figure further illustrates the present invention and, together with the detailed description of the invention, serve to explain the principles of the present invention.

DETAILED DESCRIPTION OF THE INVENTION

Figure 1:
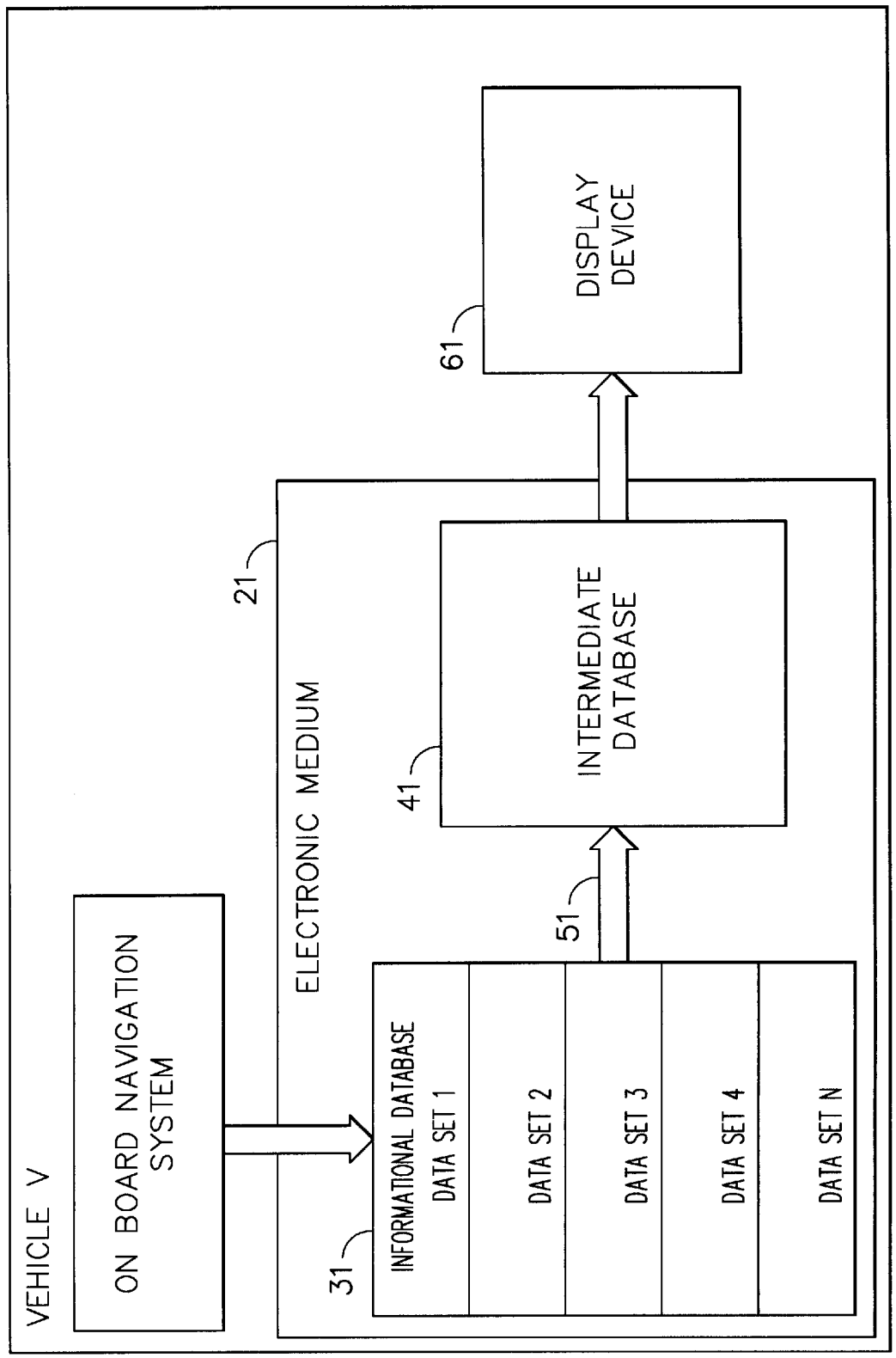
FIG. 1 is a graphical representation of one embodiment of the present invention, correspond to both the method and apparatus claims according to the present invention.

The present invention concerns a method and apparatus for continuously displaying selected navigational information on a single display unit within a vehicle V having a navigational system. In one embodiment, as seen in FIG. 1, the present invention includes an electronic medium 21 (such as, for example, a computer, a processor or a like device) in communication with the vehicle's V navigational system. The electronic medium 21 further includes memory storage space (not shown) for storage of database records. An informational database 31 is thus generated, loaded and stored on the electronic medium. The informational database 31 contains various preselected static and dynamic information arising from various sources. For example, the informational database 31 may contain information or data corresponding to weather radar, traffic collision and avoidance systems, known global terrain or geographic data (including a computer model of the surface of the earth), known obstacle data, special use airspace data, political boundaries, state/city/county or other civic boundary lines, geographic features (such as, for example, rivers, lakes or the like), navigation aids, airport information data, airway and intersection data, weather data, cultural data, man-made object data and air traffic data. Some of this information may be static information (such as, for example, known global terrain data) which will not change during the vehicle's operation and therefore, does not require constant updating, while other sources of information may be dynamic information that is dynamically updated on a real time basis (such as, for example, weather information or adjacent vehicle information) which will likely change as the vehicle is operated. Thus, those of skill in the art will realize that static information can be loaded and stored in the electronic medium 21 when the vehicle V is not in use or when the vehicle V in being maintained, whereas dynamic information can be updated and stored in the electronic medium 21 by other on-board navigational systems while the vehicle V is being operated.

Once the informational database 31 is created and stored on the electronic medium 21, an intermediate database 41 is created by a software means 51 which is loaded, stored and executed on the electronic medium 21. In one embodiment, the software means 51 creates the intermediate database 41 by initially fusing (or, collecting) preselected information from the informational database 31 and subsequently projecting (or, mapping) such preselected information to a mapping system which contains a common graphical coordinate axis which is based upon a desired reference point (such as, for example, the aircraft or a specific geographical coordinate location). In this regard, the preselected information or portions of the preselected information can be displayed in the vicinity of the reference point on the display device 61. This projection technique is required to account for the fact that planar (or, flat) surface maps are distorted because such planar maps cannot accurately depict a curved surface (such as the curvature of the earth).

In another embodiment, the software means 51 creates the intermediate database 41 by employing a processing technique which allows preselected records from the intermediate database to be displayed continuously on the display device 61. Thus, the software means 51 initially employs spatial culling so that data from the informational database are stored as a spatially sorted data structure by geographic location. Other data may also be eliminated based on the map area to be displayed. Next, the software means 51 filters the spatially stored data to obtain displayable data corresponding to the vicinity of the desired reference point (such as, for example, the location of an airplane relative to the earth or a particular geographic location on earth). The displayable data is slightly larger (for example, five to six times larger) than the data required to be displayed on the display device 61 so that the geometry represented by the displayable data can be used to continually render multiple display frames on device 61 which significantly reduces computational processing. Finally, the displayable data is projected to a mapping system which contains a common graphical coordinate axis which is based upon the desired reference point.

Most planar maps are depicted in latitude and longitude units. While such planar maps suffice to provide generalized geographic location information, such maps are heavily relied upon despite the fact that an accurate geographic location cannot be rendered (especially for those geographic locations near the north or south poles). Thus, planar map information must be projected (or, mapped) into a common coordinate system to account for the earth's curved surface. While various methods for projecting this information exist, all methods distort the final map in one way or another. However, by projecting the planar map information into a common coordinate system, the present invention significantly reduces or completely eliminates such distortion, near the center of projection.

In one preferred embodiment of the present invention, the common coordinate system is created by the software means 51 by transforming all latitude and longitude information which may exist in the informational database 31 into nautical mile information. By applying this transformation technique, a common graphical coordinate axis can be generated from the records among the various informational database 31 used. As those of skill in the art will come to realize, this projection technique allows for the creation of a common view which keeps nautical miles square. This technique substantially prevents or eliminates distortion from occurring in real time at or near the desired point of reference.

Once the intermediate database 41 is created and stored on the electronic medium 21, selected records from the intermediate database 41 can then be transmitted to a single graphical multicolor display device 61 for viewing by the vehicle's operator. The display device 61 is adapted to render the selected records from the intermediate database 41 graphically and continuously. Further, the display device is programmed to present text information in a right-side-up view relative to the vehicle's operator regardless of the vehicle's path. The display device 61 is also programmed to display known hazardous obstacles in the vicinity of the vehicle V and issue an audible or visual warning when such obstacles are in the near vicinity of the vehicle V. Thus, known obstacles (such as mountains or towers) can be simultaneously displayed with obstacles which arise during vehicle V travel (such as, for example, an approaching thunderstorm) and an appropriate audible or visual warning command can be issued. As those of skill in the art will now realize, each obstacle (whether known or which arises during the operation of the vehicle V) can now be continuously displayed in the context of a vehicle's current environment. Because the present invention allows continuous display of a vehicle's environment, obstacles or like threats to the vehicle V can now be displayed much earlier than prior art navigational devices, thereby allowing the vehicle's operator to take appropriate action to avoid the threat.

The display device 61 is further programmed to allow the vehicle V operator to control an input device (such as a computer mouse or trackball, for example) coupled to the electronic medium 21 to determine which selected record from the intermediate database 41 is to be displayed on the display device 61. Those of skill in the art will realize that many techniques may exist to display the selected records (such as, for example, by choosing a pull-down menu and selecting the desired record), however, in the preferred embodiment of the present invention, each record is graphically displayed as a selectable icon placed on the perimeter of the display's 61 viewing area.

The present invention provides information to the vehicle's operator which is generated by both onboard or dynamic and up-loaded or static data sources, thereby allowing the operator to select which features are displayed in real time at any given moment. In the preferred embodiment, the present invention provides warnings and cautions of all known hazards based on the vehicle's coordinate position since the position of all known hazards are stored in latitude, longitude and elevation units which are projected to a common graphical coordinate axis, preferably, nautical miles. Moreover, the preferred embodiment allows such features to be displayed in real time as the vehicle V is in motion so that all text may be shown right side up, regardless of the vehicle's heading. Furthermore, the present invention provides a single integrated display unit in communication with the vehicle's navigational system.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of a method and apparatus for displaying real time navigational information, is followed.

What is claimed is:

1. On a vehicle having a navigational system and an electronic medium attached to the navigational system, a method for displaying navigational information on a display unit within the vehicle, the method comprising the steps of:
    a) creating at least one informational database by a software means, each informational database loaded and stored on the electronic medium;
    b) generating at least one intermediate database by the software means, each intermediate database containing projection data representing navigational information, the intermediate database and the software means both being loaded and stored on the electronic medium;
    c) allowing the software means to transmit selected portions of the intermediate database to the display unit; and
    d) allowing the software means to continuously display and render the selected portions of the intermediate database on the display unit.

2. The method of claim 1 wherein the projection data is created by fusing preselected data from each informational database and projecting the fused preselected data to a common graphical coordinate axis, the axis based on a desired reference point.

3. The method of claim 2 wherein the informational database is selected from the group consisting of environmental terrain data, obstacle data, adjacent vehicle data, special use airspace data, political boundary data, civic boundary data, geographic feature data, navigation aid data, airport information data, airway and intersection data, weather data, cultural data, man-made object data, air traffic data, wind data and flight plan data.

4. The method of claim 3 wherein the electronic medium is a computer means including a control input device.

5. The method of claim 4 wherein the step of generating an informational database further comprises the step of obtaining preselected static information and preselected dynamic information.

6. The method of claim 5 wherein the step of obtaining preselected static information is executed when the vehicle is not operated and the step of obtaining preselected dynamic information is executed when the vehicle is operated.

7. The method of claim 1 wherein the step of generating an intermediate database further comprises the steps of allowing the software means to employ spatial and coordinate culling on the informational database to obtain spatial data stored on the electronic medium, filtering the spatial data by the software means to obtain displayable data corresponding to a geographic vicinity of a desired reference point and projecting the displayable data to a mapping system which contains a common graphical coordinate axis based upon the desired reference point.

8. The method of claim 7 wherein the desired reference point is the vehicle's coordinate position relative to the earth.

9. The method of claim 7 wherein the desired reference point is a preselected geographical coordinate location.

10. The method of claim 8 wherein the step of projecting the displayable data to a mapping system further includes the step of transforming all preselected information containing latitude and longitude information into nautical mile information.

11. The method of claim 10 wherein the step of displaying and rendering the selected portions of the intermediate database on the display unit further comprises the step of displaying text information in a right-side-up view with respect to the vehicle's operator.

12. The method of claim 11 wherein the step of displaying and rendering the selected portions of the intermediate database on the display unit further comprises the step of providing an audible or visual warning when the vehicle is threatened by an obstacle.

13. The method of claim 12 wherein the step of displaying and rendering the selected portions of the intermediate database on the display unit further comprises the step of displaying at least one desired icon on the display, each icon corresponding to the selected portions of the intermediate database.

14. A method for displaying real time navigational information on a single display device coupled to a vehicle having a navigational system, the method comprising the steps of:

a) providing an electronic medium in communication with the navigational system;

b) creating and storing at least one informational database by a software means stored on the electronic medium;

c) generating and storing an intermediate database on the electronic medium by the software means, the intermediate database containing projection data representing navigational information, the projection data created by fusing preselected data from each informational database and projecting the fused preselected data to a common mapping system containing nautical mile information;

d) transmitting selected portions of the intermediate database to a multicolor display device by the software means; and e) continuously displaying the selected portions of the intermediate database on the display device.

15. The method of claim 14 wherein the informational database is selected from the group consisting of environmental terrain data, obstacle data, adjacent vehicle data, special use airspace data, political boundary data, civic boundary data, geographic feature data, navigation aid data, airport information data, airway and intersection data, weather data, cultural data, man-made object data, air traffic data, wind data and flight plan data.

16. The method of claim 15 wherein the step of generating an informational database further comprises the step of obtaining preselected static information and preselected dynamic information, the step of obtaining preselected static information being executed when the vehicle is not operated and the step of obtaining preselected dynamic information being executed when the vehicle is operated.

17. An apparatus for displaying a vehicle's coordinate location on a display unit within a vehicle, the vehicle having a navigational system, the apparatus comprising:

a) an electronic medium in communication with the navigational system;

b) an informational database loaded and stored on the electronic medium, the informational database created by a software means stored on the electronic medium;

c) an intermediate database created from the informational database by the software means, the intermediate database being loaded and stored on the electronic medium, the intermediate database containing projection data representing navigational information, the projection data created by fusing preselected data from the informational database and projecting the fused preselected data to a common graphical coordinate axis, the axis based on a desired reference point; and d) a display device in communication with the electronic medium, the display device receiving selected portions of the projection data and simultaneously and continuously displaying and rendering the selected portions of the projection data.

18. The apparatus of claim 17 wherein the informational database is selected from the group consisting of environmental terrain data, obstacle data, adjacent vehicle data, special use airspace data, political boundary data, civic boundary data, geographic feature data, navigation aid data, airport information data, airway and intersection data, weather data, cultural data, man-made object data, air traffic data, wind data and flight plan data.

19. The apparatus of claim 18 wherein the electronic medium is a computer means including a control input device.

20. The apparatus of claim 19 wherein the informational database contains preselected static information and preselected dynamic information.

21. The method of claim 20 wherein the preselected static information is obtained when the vehicle is not operated and the preselected dynamic information is obtained when the vehicle is operated.

22. The apparatus of claim 21 wherein the desired reference point is the vehicle's coordinate position relative to the earth.

23. The apparatus of claim 22 wherein the desired reference point is a geographical coordinate location.

24. The apparatus of claim 23 wherein the projection data contains nautical mile information.

25. The apparatus of claim 24 wherein the display device displays at least one icon, each icon corresponding to the selected portions of the projection data.

26. An apparatus for displaying a vehicle's coordinate location on a display unit within a vehicle having a navigational system, comprising:

a) and an electronic medium attached to the navigational system;

b) a software means loaded and stored on the electronic medium;

c) at least one informational database created by a software means, each informational database loaded and stored on the electronic medium, each intermediate database created by spatially and coordinately culling the informational database to obtain spatial data stored on the electronic medium, filtering the spatial data by the software means to obtain displayable data corresponding to a geographic vicinity of a desired reference point and projecting the displayable data to a mapping system which contains a common graphical coordinate axis based upon the desired reference point;

d) allowing the software means to transmit selected portions of the displayable data to the display unit; and e) allowing the software means to continuously display and render the selected portions of the displayable data on the display unit.

* * * * *